(12) United States Patent
Skare (10) Patent No.: US 8,595,831 B2
(45) Date of Patent: Nov. 26, 2013

(54) METHOD AND SYSTEM FOR CYBER SECURITY MANAGEMENT OF INDUSTRIAL CONTROL SYSTEMS

(75) Inventor: Paul M. Skare, Plymouth, MN (US)

(73) Assignee: Siemens Industry, Inc., Alpharetta, GA (US)

( * ) Notice: Subject to any disclaimer, the term of this patent is extended or adjusted under 35 U.S.C. 154(b) by 367 days.

(21) Appl. No.: 12/937,792

(22) PCT Filed: Apr. 14, 2009

(86) PCT No.: PCT/US2009/002327
§ 371 (c)(1),
(2), (4) Date: Oct. 14, 2010

(87) PCT Pub. No.: WO2009/128905
PCT Pub. Date: Oct. 22, 2009

(65) Prior Publication Data
US 2011/0039237 A1  Feb. 17, 2011

(51) Int. Cl.
*G06F 11/00* (2006.01)
(52) U.S. Cl.
USPC .............................. 726/22; 726/3; 434/118
(58) Field of Classification Search
USPC ..................................... 434/118; 726/3, 22
See application file for complete search history.

(56) References Cited

U.S. PATENT DOCUMENTS

| | | | |
|---|---|---|---|
| 7,188,003 B2 | 3/2007 | Chivers et al. | |
| 7,233,843 B2 | 6/2007 | Budhraja | |
| 7,246,156 B2 | 7/2007 | Ginter | |
| 7,448,073 B2 | 11/2008 | Rosenberger | |
| 7,483,972 B2 | 1/2009 | Bhattacharya | |
| 7,593,013 B2* | 9/2009 | Agutter et al. | 345/440 |
| 2003/0005326 A1* | 1/2003 | Flemming | 713/201 |
| 2004/0193329 A1 | 9/2004 | Chivers et al. | |
| 2005/0132225 A1* | 6/2005 | Gearhart | 713/201 |
| 2006/0031938 A1* | 2/2006 | Choi | 726/25 |
| 2006/0236374 A1 | 10/2006 | Hartman | |
| 2007/0180522 A1* | 8/2007 | Bagnall | 726/22 |
| 2007/0180525 A1* | 8/2007 | Bagnall | 726/23 |
| 2007/0188494 A1* | 8/2007 | Agutter et al. | 345/440 |
| 2007/0294369 A1 | 12/2007 | Ginter | |
| 2008/0109889 A1 | 5/2008 | Bartels | |
| 2008/0209033 A1 | 8/2008 | Ginter | |
| 2010/0153156 A1* | 6/2010 | Guinta et al. | 705/8 |
| 2012/0284790 A1* | 11/2012 | Bhargava | 726/22 |

FOREIGN PATENT DOCUMENTS

| | | | |
|---|---|---|---|
| EP | 1544707 A1 | 6/2005 | |
| EP | 1881388 A1 | 1/2008 | |

* cited by examiner

*Primary Examiner* — April Y Blair (57) ABSTRACT

A method and system for cyber security management of Supervisory Control And Data Acquisition (SCADA) systems is provided to enhance situational awareness and cyber security management for industrial control systems. A centralized System Security Manager (SSM) is integrated into a SCADA to collect security related data for the industrial control system and an integrated command and control user interface displays security related data, a system security level, and interfaces with a user to allows for changing of system security settings for the industrial control system based on the security related data collected and manages changes in operational state of the SCADA based on the security level to restrict use of system interfaces and system accesses.

20 Claims, 7 Drawing Sheets

METHOD AND SYSTEM FOR CYBER SECURITY MANAGEMENT OF INDUSTRIAL CONTROL SYSTEMS

CROSS-REFERENCE TO RELATED APPLICATIONS

This application is the US National Stage of International Application No. PCT/US2009/002327, filed Apr. 14, 2009 and claims the benefit thereof. The International Application claims the benefit of U.S. Provisional application No. 61/045,739 filed Apr. 17, 2008. All of the applications are incorporated by reference herein in their entirety.

FIELD OF THE INVENTION

This invention is related to a method and system for cyber security management of industrial control systems and more particularly to cyber security management of Supervisory Control And Data Acquisition (SCADA) systems.

BACKGROUND OF THE INVENTION

A Supervisory Control And Data Acquisition (SCADA) system generally refers to an industrial control system: a computer system monitoring and controlling a process. SCADA systems are used to control and monitor physical processes, examples of which are transmission of electricity, transportation of gas and oil in pipelines, water distribution, and the like. SCADA systems are also part of an Energy Management Systems (EMS) and Distribution Management System (DMS). A SCADA system usually comprises the following subsystems: A Human-Machine Interface—HMI (also known as User Interface—UI or Man Machine Interface—MMI) is the apparatus which presents process data to a human operator and through this, the human operator, monitors and controls the process (The HMI comprises a computer monitor or a custom display panel, which reports status information across the system being controlled); A supervisory (computer) system, gathering (acquiring) data on the process and sending commands (control) to the process; Remote Terminal Units (RTUs) connecting to sensors in the process, converting sensor signals to digital data and sending digital data to the supervisory system; Programmable Logic Controller (PLCs) are sometimes used as field devices because they are more economical, versatile, flexible, and configurable than special-purpose RTUs; Communication infrastructure connecting the supervisory system to the Remote Terminal Units.

The move from proprietary technologies to more standardized and open solutions together with the increased number of connections between SCADA systems and office networks and the Internet has made them more vulnerable to attacks. Consequently, the security of SCADA-based systems has come into question as they are increasingly seen as extremely vulnerable to cyber attacks. In the field of SCADA systems, cyber security solutions are typically separate or add-in solutions. This prevents a single integrated solution providing for full situational awareness with immediate workflow based access to all needed information and controls. Defining all the parameters relating to the various disparate security add-ons is also cumbersome and error prone. Finally, providing a fully integrated training simulator to allow SCADA operators to learn how to use the actual system with its security features has been lacking in the market. Therefore there is a need in the art to integrate these functions all into a single command and control solution.

Current product approaches include IBM Tivoli Netview and HP's Openview products. The above noted products do not provide an integrated solution with full access to internal SCADA functions, they do not provide a single source to enter configuration data, and they do not provide a full training simulation with the actual SCADA system included.

A number of patents exist which relate to cyber security including, U.S. Pat. Nos. 7,188,003, 7,233,843, 7,246,156, and 7,483,972, and Publication Nos. 20080209033, 20080109889; all of which are incorporated herein by reference.

There is a need for systems that enhance situational awareness for industrial control systems. There is a further need for systems that enhance situational awareness for industrial control systems for improved cyber security. Accordingly, there is a need in the art for an integrated solution to the problems in the art. The present invention is designed to address these needs.

SUMMARY OF THE INVENTION

Broadly speaking, the invention provides a method and system for cyber security management of Supervisory Control And Data Acquisition (SCADA) systems. The invention is a method and system for integrating cyber security engineering, command and control, and training into a single holistic solution with a SCADA system. The invention provides for a integrated solution of the engineering system where configuration data is defined only once; an integrated set of user interface displays with direct connections into internal SCADA functions, data, alarms, and controls; and extensions to the Operator Training Simulator to train users how to properly use the cyber security features. The invention is operated by having all security related information (monitored data, alarms, security settings) organized into a single set of displays, allowing for the monitoring of security events, and the changing of system security settings from a single place in the user interface.

The invention can be implemented in numerous ways, including as a system, a device/apparatus, a method, or a computer readable medium. Several embodiments of the invention are discussed below.

As a method, the invention comprises a computer-implemented method for providing an integrated command and control user interface in a Supervisory Control And Data Acquisition (SCADA) to enhance situational awareness and cyber security management for industrial control systems, the method comprising: providing a centralized System Security Manager (SSM) program module executable by a processing device and integrated into a SCADA wherein the SSM collects security related data for the industrial control system; displaying by the SSM program module an integrated command and control user interface comprising a system monitoring pane comprising security related data collected by the SSM, a system security status pane comprising a system security level, and a system security settings pane allowing for changing of system security settings for the industrial control system; and wherein the integrated command and control user interface allows setting of the system security level based on the security related data collected and changes in operational state of the SCADA based on the security level to restrict use of system interfaces and system accesses.

In further embodiments, the system security level comprises a plurality of levels where each level includes restrictions from lower levels and the system security level is associated with both cyber security and physical security of the industrial control system.

In still further embodiments, the integrated command and control user interface has a configuration pane to configure the SCADA including defining of criticality indices of power system assets of the industrial control system. The criticality indices are a measurement of critical infrastructure importance associated with power system assets of the industrial control system. The SSM calculates and displays in the integrated command and control user interface an overall Criticality Index for each Remote Terminal Unit (RTU) line and Inter Control-Center Communications Protocol (ICCP) link based on the criticality indices of power system assets to provide Situational Awareness of the critical infrastructure importance associated with a communications link.

In still further embodiments, the method includes disabling less secure connections and accesses to the system based on the system security level. Features include automatically isolating communications in a prioritized fashion based on the overall Criticality Index in response to an elevation of the security level. Moreover, it includes automatically implementing predictive state changes in operational state of the SCADA due to predetermined patterns in the security related data.

The method also provides an interface for the SSM to an Independent SCADA Health Monitor to monitor the health of SCADA computers and networking devices. The SSM is further interfaced with an Event Correlation Engine (ECE) to send the SSM key events from the ECE to provide a wider system view.

White list functionality is provided that allows IP addresses to be defined which are trusted and not deemed as high a security risk so that white list traffic will not set an alarm. Moreover, black list functionality is provided that allows IP addresses to be defined which are deemed a security risk so that black listed traffic will always set an alarm. Other features include trace-back of identified security event sources when a security event is identified and collecting of logs and traces for the security event.

A selectable autopilot function is provided to allow the SSM to automatically set the security level based on security related data collected. A training mode is also provided.

The methods of the present invention may be implemented as a computer program product with a computer-readable medium having code thereon implementing the steps of the invention.

As an apparatus, the present invention may include at least one processor, a memory coupled to the processor, and a program residing in the memory which implements the methods of the present invention. The invention provides an integrated command and control infrastructure built-into the SCADA system that allows internal functions of SCADA to be programmatically accessed into a single set of user interface displays as well as interfacing to external security monitoring products for Ethernet or communications traffic.

An advantage of the present invention is that all configuration data is only entered once, meaning there is a lower chance of creating accidental errors by improperly entering the same data more than once. Another advantage is that full access to internal SCADA functions as well as the best external security products via interfaces allowing a single place for the user is available to the command and control user interface and the user interface is the same look and feel as the rest of the SCADA system. Another advantage of the invention is that an operator training simulator provides for a simulation of the SCADA system including the same user interface displays that are used in production, allowing the user to be trained on the situational awareness aspects of monitoring SCADA for security incidents.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention builds upon a secured Supervisory Control And Data Acquisition (referred to as SCADA herein) with an Independent Health Monitoring (IHM) solution, by adding a centralized Security Command and Control (System Security Manager—SSM) system integrated into the SCADA. The usability of the SSM is modeled to provide a strategy for Situational Awareness (SA) throughout the workflow. This is supported for training and drilling purposes in the SCADA's Operator Training Simulator (OTS). This allows instructors to set up security event scenarios and repeatedly drill users on security events, and stop the simulation and perform spot tests to evaluate the user's grasp of the situation.

The SSM collects security related data for display and operator action. This data includes Intrusion Detection System (IDS) monitoring with SCADA signatures, SCADA security alarms, SCADA user connections, SCADA Remote Terminal Unit (RTU) & Inter Control-Center Communications Protocol (ICCP) link status, SCADA security related telemetry, health monitoring events collected via Web Based Enterprise Management (WBEM) (for SCADA computer monitoring), and Simple Network Management Protocol (SNMP) (for network devices) via third party products, system events correlated by a third party event correlation product, and system statistics. Automatic trace-back of identified security event sources when a security event is identified, as well as automatic collection of security logs involving the event is triggered for forensic review.

The invention improves the security of industrial controls systems (e.g., those for electricity transmission and distribution) with new security Situational Awareness by collecting relevant security information, visualizing it, and providing a logical workflow in the UI to control the system. A method for an optional 'autopilot' function whereby the system will automatically change security levels based on relevant inputs is provided. This work is added to an existing hardened system that already supports secure communications. This work identifies remote access and strategically responds to elevation of security posture by isolating communications in a prioritized fashion. This work is designed to use standards and third party products common in Information Technology (IT) environments such that the solution can easily be used in an environment integrated in the enterprise. The new SSM function allows for monitoring of the security events into the system for analysis and subsequent changes in control. This work also builds upon an existing signature for the IDS, and uses the IDS as inputs to the analysis.

The invention may follow standard approaches. Examples of standards include the models defined in UML by the International Electrotechnical Committee (IEC) Technical Committee 57 (TC57) Common Information Model (CIM) (IEC CIM) and the Distribution Management Task Force (DMTF) Common Information Model (CIM) (DMTF CIM). By using these standards and third party products, and by deployment as part of Spectrum Power 3 (Siemens UNIX-based Spectrum Power 3) in a Service Oriented Architecture (SOA) using component technology, missing long term trends and obsolescence is avoided prior to the end of the technology's life-cycle. This approach builds upon the existing SCADA product, Spectrum Power 3 which is widely in use. Spectrum Power 3 provides comprehensive and efficient SCADA basic functions for monitoring and controlling, measuring result processing, complex calculations, alarms, and operating sequence administration. Simulation tools support the testing of operating sequences in advance or the subsequent analyzing of network failures. The Spectrum Power 3 system has a graphic user interface with intuitive operation, e.g. a basic signal window gives an overview of the general network state, individual customization and multiscreen functionality is possible. Data are entered according to the technical data available in the network. Menu-driven masks further facilitate the job, and inconsistency checks prevent faulty data inventories. The Spectrum Power 3 SCADA acquires process data via the front-ends and the real-time data servers. The data acquisition servers are linked to the remote terminal units (RTUs), while the communication servers ensure secure data exchange with other control centers, employing protocols such as ICCP. This provides for a wide applicability and consideration for use in legacy systems during upgrades. Since the run-time aspects may be implemented in the core SCADA portion of Spectrum Power 3, it is designed for continuous use.

The invention preferably follows standards and industry trends, so switching to different third party products will be simple. Networking equipment meeting the systems needs and supporting SNMP or WBEM, standard hardware platforms such as IBM's eServers and xServers using operating systems AIX and Windows ensures long term support of different vendors solutions. The technology protects against unauthorized authentication at all remote access points by leveraging the Identify, Authority, and Resource Management capabilities of Spectrum Power 3 release 3.10 and beyond, which uses a Light-weight Directory Access Protocol (LDAP) repository for user credentials and Single Sign-On for the UI.

A preferred embodiment of the method is comprised of the following steps: Integrating all configuration data into a single engineering system that also can feed configuration data to external security programs (for example, to an intrusion detection system); Integrating all security related real-time SCADA data to a single set of displays including monitored data points, generated alarms, and settings for security parameters into a single set of user interface displays, allowing for the user to identify, verify, and then react to a security event by disabling less secure connections and accesses to the system; and adding the simulation capability to the operator training simulator to include security inputs, settings, and displays for the instructor to define security related training scenarios for the student.

Figure 1:
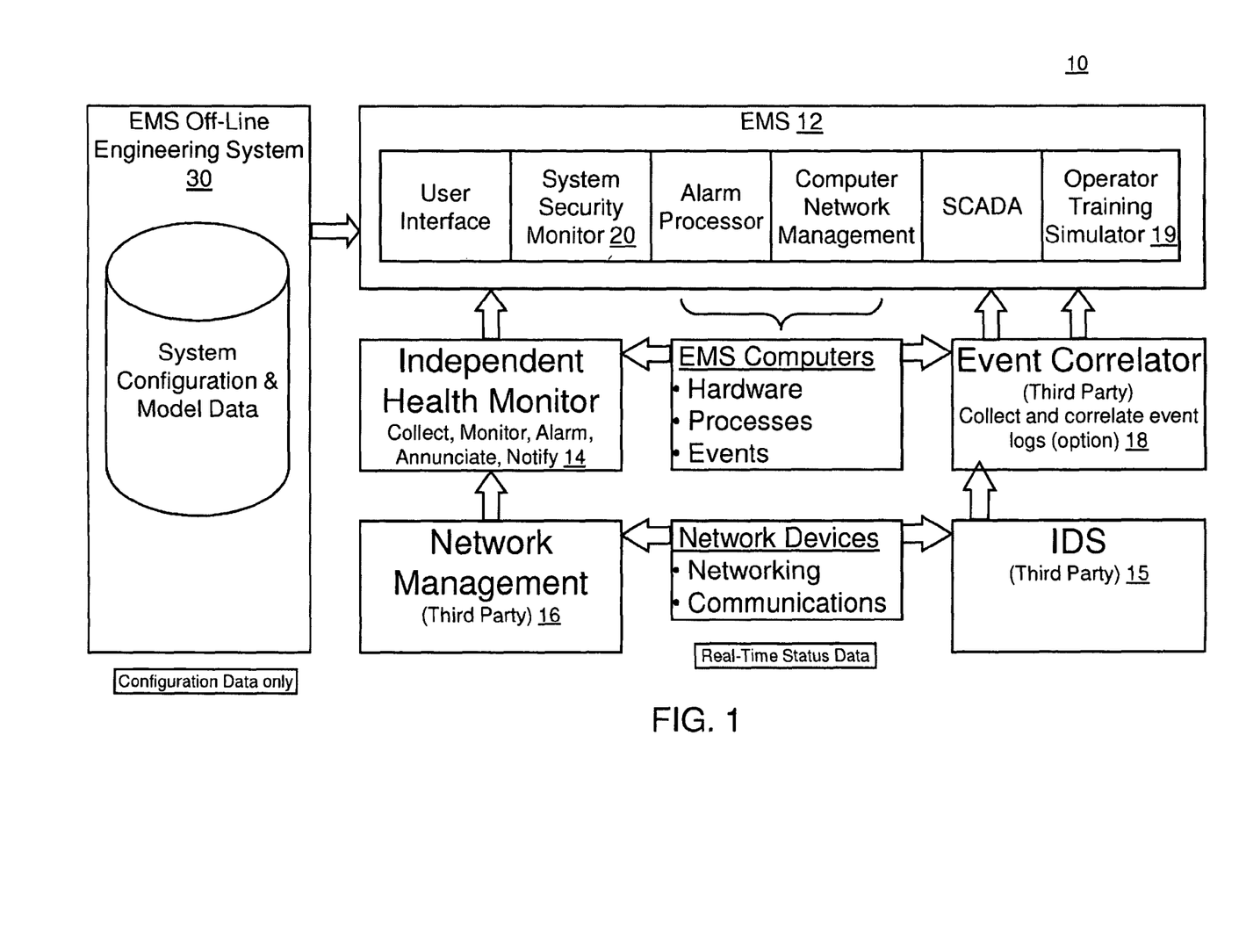
FIG. 1 is an architectural drawing of a SCADA system with external security programs included to show how engineering data, real-time data, and controls are integrated together.

FIG. 1 is an architectural drawing of a SCADA system 10 with external security programs included to show how engineering data, real-time data, and controls are integrated together. Specifically, the invention includes a System Security Manager (SSM) 20 as part of the SCADA 12 that collects security statuses, sets a system security level (similar to the North American Electric Reliability Council (NERC) security level) and can control changes in operational state of the SCADA based on the security level (a security dashboard & autopilot). It also includes an interface for the SSM to an Independent SCADA Health Monitor 14 which ties network security more closely into an SCADA as an independent monitoring approach with integrated data engineering to monitor the health of SCADA computers and networking devices. The SCADA Monitor would then interface to a Third Party Product ($3^{PP}$) Network Management System 16. The invention further interfaces the SSM to an Event Correlation Engine (ECE) 18 to send the SSM key events from the $3^{PP}$ ECE to provide a wider IT system view.

The invention supports all of the above with an Operator Training Simulator (OTS) 19 to ensure system operations and administration staff trained in proper usage during a security event.

Figure 2:
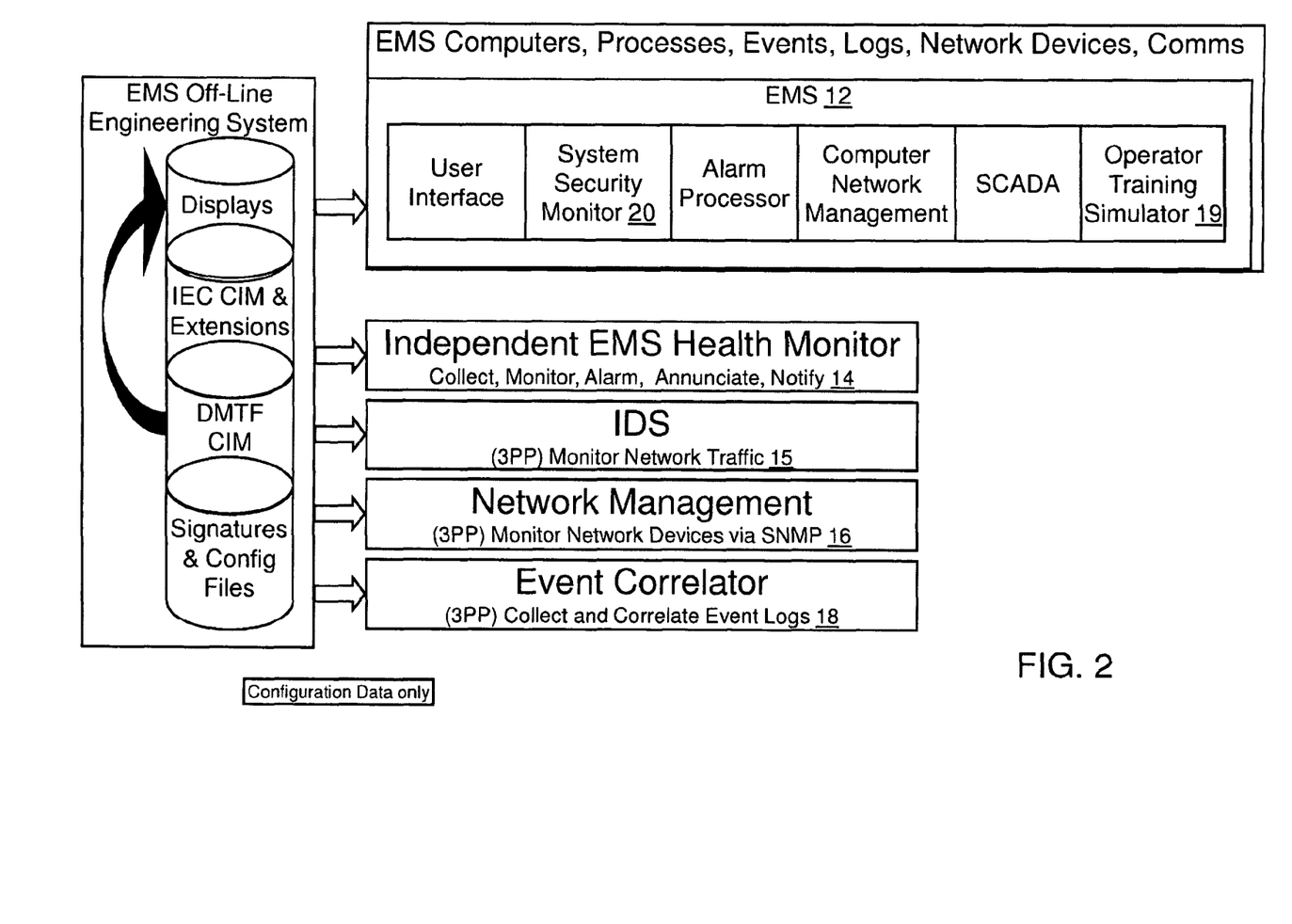
FIG. 2 is an architectural drawing illustrating the Engineering Mode for creating, entering, modifying, and verifying configuration data needed by various parts of the system.

FIG. 2 is an architectural drawing illustrating the Engineering Mode for creating, entering, modifying, and verifying configuration data needed by various parts of the system. The Engineering Mode defines the cycle of creating, entering, modifying, and verifying configuration data needed by various parts of the system. The SCADA has an Engineering System component 30 for this activity. The following key items are defined: Power System Model (PSM)—defines the characteristics and topology of the power grid, based on the IEC TC57 CIM. Computer Network Model (CNM)—defines the characteristics and topology of the computers and networking devices in the control system's computer network, based on the DMTF CIM. Displays—these are the individual screens that can be called up within the User Interface of the SCADA 12 either in Real-Time or in Training Mode. They display information or one line diagrams of either the PSM or the CNM. They can be auto-created based on the information in the PSM and CNM. Signatures or configuration files: These are configuration files for third party products that can be derived or calculated from the data entered for the PSM or CNM. This includes the following: IHM 14, IDS 15 (network or host based), Anti-Virus, Firewalls, Network Management 16, and Event Correlator 18.

The present invention adds an important CIM extension in the form of a new attribute for every Power System Resource. This new attribute is to allow a 'Critical Infrastructure Level of Criticality' to be defined for each asset in the Power System. This addition will allow any 'Risk-Based Tool to Enumerate Critical Assets' to have synergy with the data engineering of the SCADA for potential on-line applications of risk enumeration and awareness.

For example, The System Security Manager 20 calculates an overall 'Criticality Index' for each RTU line and ICCP Link, based on the criticality defined for each Power System Resource (Asset). This would allow a user to be Situationally Aware of the critical infrastructure importance associated with a communications link. In other words, an RTU link to a substation for a nuclear power plant is more critical than an ICCP link to a data historian, and the user will be able to see an index showing a numerical comparison of importance of the links.

Figure 3:
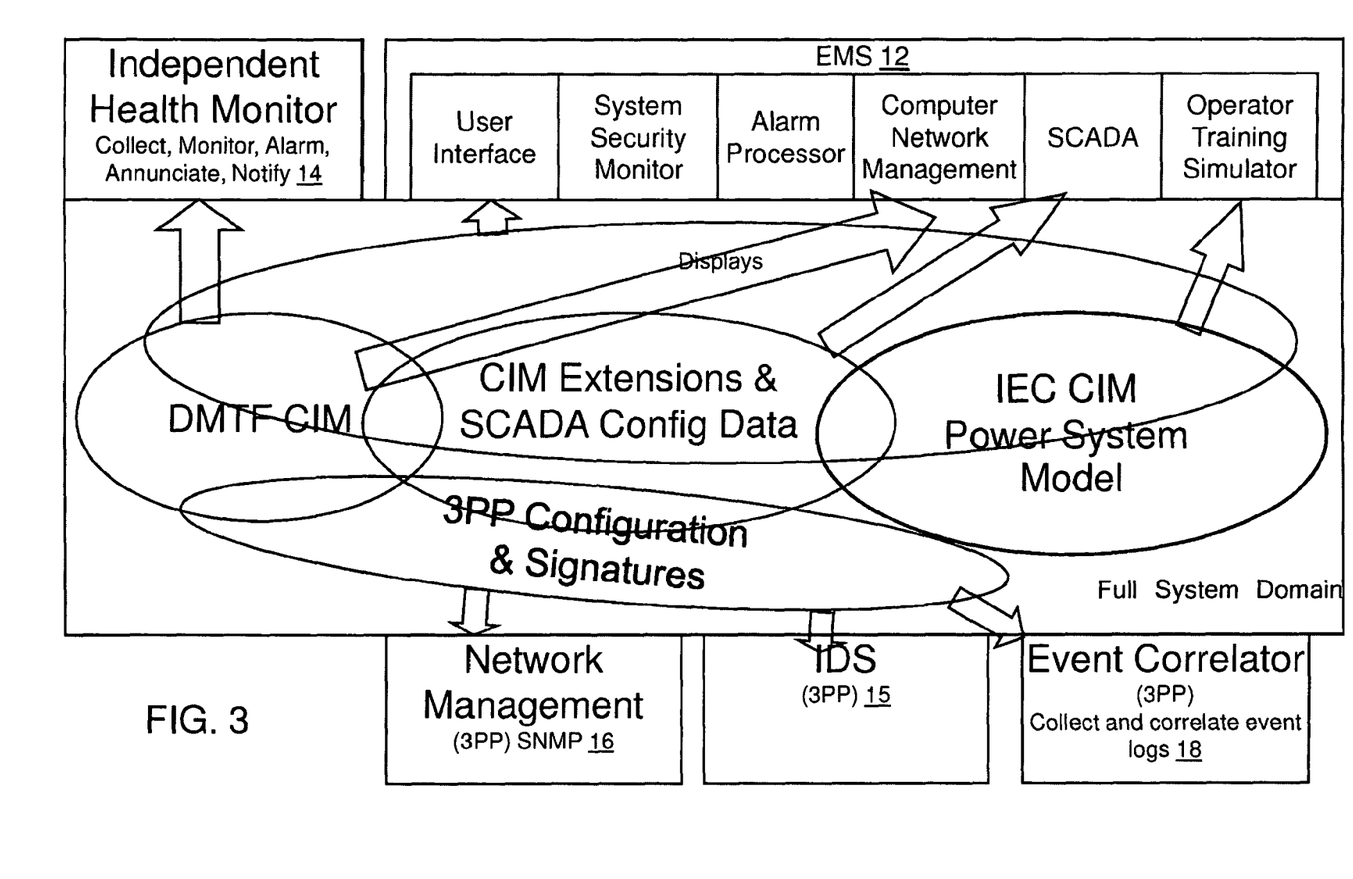
FIG. 3 is an information domain drawing showing where different types of configuration data are unique or overlap.

FIG. 3 is an information domain drawing showing where different types of configuration data are unique or overlap. The information domain drawing shows where different types of configuration data are unique or overlap. In a modern SCADA, much attention is given to minimization of error points due to data entry, and maximization of ease of use. In order to minimize the errors associated with setting up and configuring this system, enhancements to the Engineering System eliminate places of double data entry.

Figure 4:
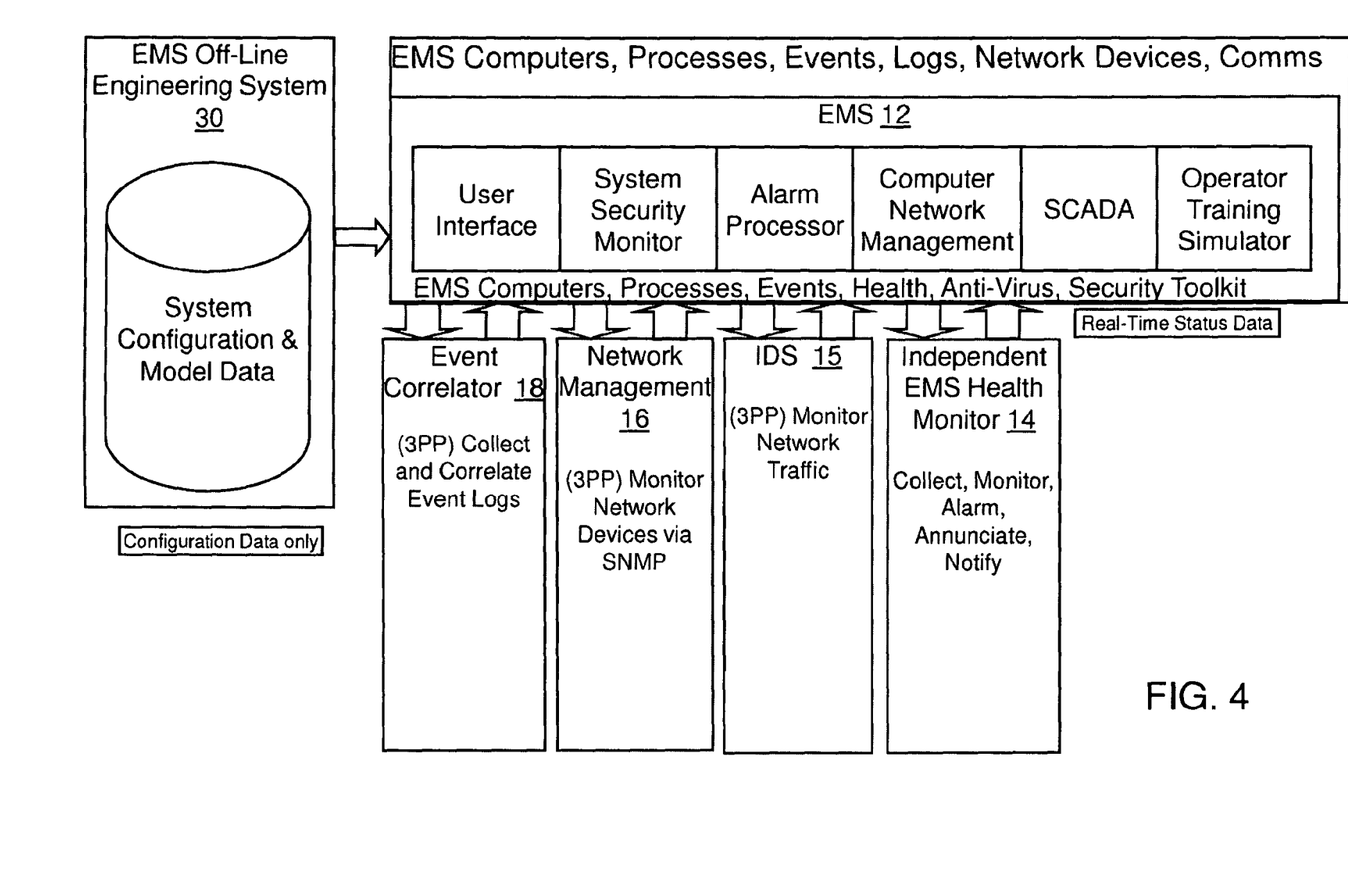
FIG. 4 is an architectural drawing illustrating the Real-Time Mode that defines the data traffic flows during real-time operation of the system where the SCADA has an internal high speed bus and system interfaces for this activity.

FIG. 4 is an architectural drawing illustrating the Real-Time Mode that defines the data traffic flows during real-time operation of the system where the SCADA has an internal high speed bus and system interfaces for this activity. The following key items are defined: Independent Health Monitor (IHM)—collects the status information of key processes and hardware health of the SCADA for independent monitoring. Network Management (NM)—a third party product that monitors the network and computing devices for status. These status and event data are sent via an interface to the system: Intrusion Detection System (IDS)—a third party product that monitors the network for any traffic that should not be there. Status and alarm data are sent via an interface to the system; Event Correlator (EC)—a third party product that collects logs from all computers, networking devices, and SCADA computers and applications. It then correlates these events to determine key root cause events from the thousands/millions of events; Anti-Virus (AV)—a third party product on each SCADA computer monitoring for signs of viruses. Status and alarm data are sent via an interface to the system; Security Toolkit (ST)—Siemens software that monitors the system for security irregularities. Status and alarm data are sent to the system via interfaces.

The System Security Manager 20 is an integrated part of an SCADA 12 that collects security statuses, sets a system security level (similar to the NERC security level) and sets changes in operational state of the SCADA based on the security level (a security dashboard & autopilot) on the fly. Also allows automatic or manual reactions to current security state and associated system metrics.

To minimize the risk of the SCADA system, various aspects of access and communications are correlated to the risk associated with the security environment. Of primary importance is the need to maintain certain functionality while addressing the threat. Various isolations of external connections and access are considered, including the severing of external communications, isolation and segmentation of traffic, access controls and modification to the SCADA system.

Figure 6:
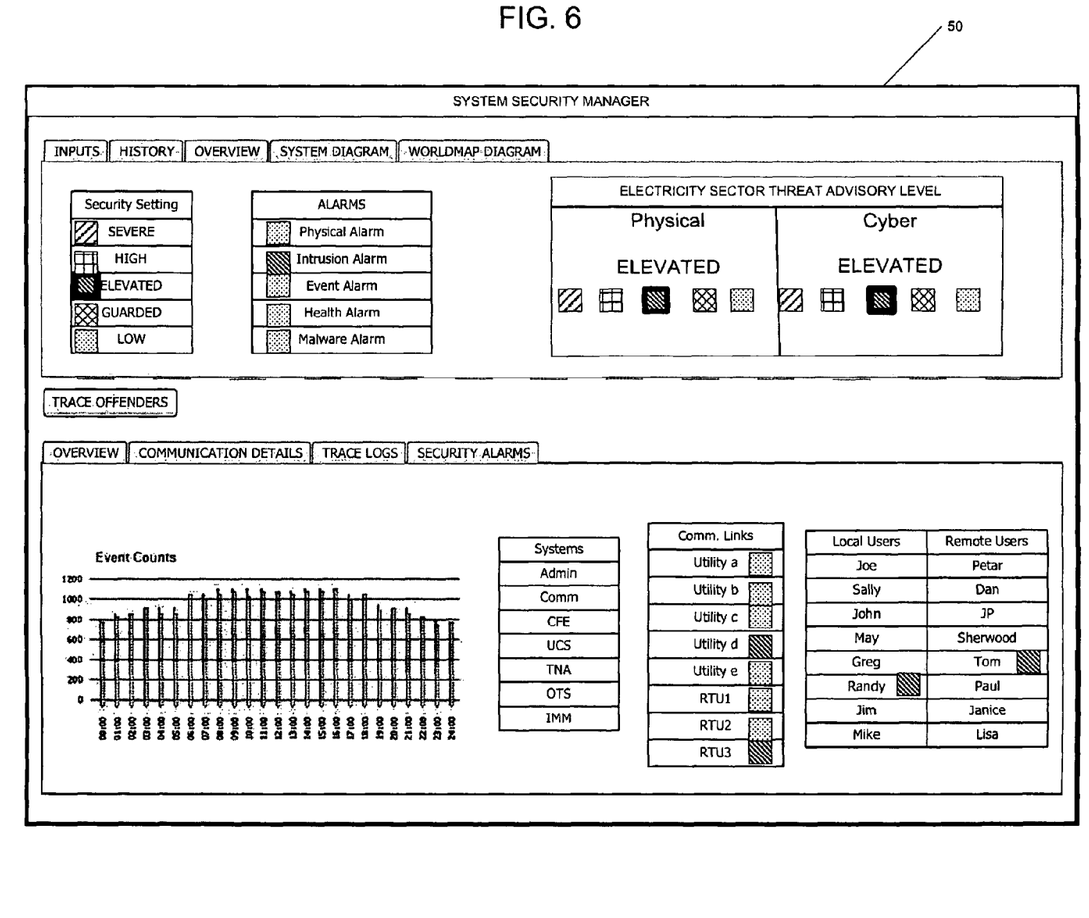
FIG. 6 shows a sample user interface for the System Security Manager showing how all the data, alarms, and security settings and controls are integrated into a single set of displays.

FIG. 6 shows a sample user interface 50 for the System Security Manager 20 showing how all the data, alarms, and security settings and controls are integrated into a single set of displays. The sample user interface display shows how security settings can be set for the system, monitored data can be displayed, and status of key interfaces and controls to disable them can be linked.

An integrated System Security Manager user interface display 50 is provided which has the following information available from the base system, as well as room for utility specific additions:

(1) Security inputs. Security inputs may include, for example: Remote & Local users list, including SCADA Users and operating system users logged in; Secured & Unsecured communications list (RTUs, Data links, system interfaces); Unacknowledged security alarm list—links to call up full security event and alarm lists; All security inputs from RTUs, physical security services, and Data Links (door open sensors, etc.) linked into a geographic world map picture; Last time binaries changed (patches applied); Interface to a 3rd party centralized event logging/correlation system; Interface of status from a network IDS; Interface of status from host IDS; Interface of firewalls status/security events; Interface of status from an independent SCADA monitor; Interface of security event logs (syslog from common event logs); Interface to Anti-Virus; security policy applied; operator logged in; # of login failures; # of security warnings; # of security errors; and Remote vendors or authorized external contractors connected. The solution is designed to be extended with additional inputs from other security related sources as desired.

(2) System Security Levels. SSM uses inputs from the SCADA Security event and alarm lists, the ECE and independent SCADA monitoring, system metrics, as well as the system security setting. The system security setting may be a plurality of levels (e.g., a list of 1 to 5 levels) where each level includes the restrictions from the lower levels. For example: Green: Low Risk where all types of remote users, remote vendor support, system access and communications are allowed. Blue: Guarded Risk where remote system access (OS) is not allowed. Yellow: Elevated Risk where remote users (OS or SCADA) not allowed. Orange: High Risk where only 'operator' SCADA users allowed. No visitors are allowed in control center via physical security (policy). Engineering changes require additional approval before activation. Red: Severe Risk where only secure communications allowed. This introduces the danger of losing observability of power system and is dependent on a system having sufficient secure communications in place. No engineering changes to the system are allowed. Dangerous traffic is automatically traced.

(3) AutoPilot. A user selectable option includes predictive state changes automatically due to behavioral patterns.

(4) White list/Black list. A 'white list' allows IP addresses to be defined which are trusted, and will not be deemed as high a security risk. A 'black list' allows IP addresses to be defined which are always deemed a security risk. White listed traffic will not be alarmed; black listed traffic will always be alarmed.

(5) Tracing. If a security event is determined to exist, a program attempts to trace the intruder back to its source, and also initiate the collection of logs and traces for this event.

(6) Sharing. A standardized approach to share system security state between trusted partners (other utilities) via ICCP ties in to this, allowing users to know if a neighboring utility has a security event occurring.

The Independent Health Monitor (IHM) will now be described. A standalone system that is 'SCADA Aware' monitors the state of the SCADA hardware, software, and network devices (and monitors key processes like the Alarm Processor). IHM uses the DMTF WBEM standards. It provides software tools based on a standard information model and interoperability specifications which are used to establish monitoring of critical individual components in the SCADA IT network. IHM can run independently from the Spectrum Power applications and is supported on UNIX®, Linux, and Microsoft Windows®. This ties in with a data model based on the DMTF CIM in the engineering system of the SCADA. This allows information from the IHM to run standalone with independent UI and alarming and notification, as well as feed the information back into the SCADA for display. One Line Diagrams of the network topology can then be created in the SCADA native UI.

This is different from using a regular third party product like Tivoli NetView or HP OpenView because of the specific SCADA knowledge it has, but it can be fed from SNMP tools—a way to tie the two worlds together. IHM monitors SCADA system integrity and alerts operations personnel if critical portions of the system fail. This includes applications, databases, and file systems in the real time environment. The monitored results are provided to the utility personnel so that potential problems can be analyzed and presented for corrective actions before they affect the operation of the system. In this way, IHM assists the system operator to avoid SCADA system failures that could cause a blackout condition, such as the one that contributed to the North American Northeast region in 2003.

Some critical system factors monitored include System mode for host, Time on monitored system, Time difference with monitoring system, Free space and size of each disk, Severity presented on the client as a green, yellow or red light, Alarm Processor Status: (OK, The process is not active).

The IHM user interface is implemented, for example, as a Java application that can run on one or more systems to periodically collect the data from all monitored system components. This can be done either upon user request or asynchronously. The UI enables the user to filter and sort the messages. The IHM UI displays the monitored components with color-coding to indicate their status: green (good), yellow (degraded) or red (failure). It also displays a message indicating any additional information about the state.

For Alarming and Notification, as an option, IHM can be integrated with WirelessOffice® components from Emergin to interface to the wireless service providers. This enables IHM to send unacknowledged alarm messages to relevant personnel's pagers or email to notify them of alarms. The system administrator can manage this messaging capability by designating individual and group recipients, specifying shifts, filtering, and routing incoming messages to the appropriate recipients.

Example Paging Criteria includes exceeding a threshold of unacknowledged alarm messages with a specified priority rating, the elapsed time exceeds the criteria for the oldest unacknowledged alarm for the Area of Responsibility (AOR) and priority.

The IHM provides audible alarms when component failures are detected. It also uses color-coding in the user interface to indicate the following alarm notification status: The display field's color for the AOR and Priority will change from its normal green to yellow if more messages have been sent. The display field's color will change to red if no more messages will be sent. The display field's color will return to green, its normal coloration, after all alarms for the AOR and Priority have been acknowledged.

Operation of the invention after it has been installed as part of a normal SCADA installation involves considering three different aspects of operation: Setup, training, and real-time use. During setup, all related configuration data is entered and validated within a single engineering subsystem of SCADA. During training, an instructor defines scenarios with sample data changes and injects changes into what appears to the student as an actual running version of the SCADA system. The student must then monitor this information, learn how to identify security events and the proper way to respond to the events. The instructor is able to stop the training at any time, and drill the student on situational awareness questions pertaining to the current state of the system. During real-time operation, the user monitors, verifies, follows trained procedures and tightens security in the system, as well as properly following written processes for cyber security incident response.

A preferred mode of the invention involves building the security features directly into the base SCADA product's engineering, user interface, and operator training simulator components. An alternate version of the invention involves using an add-on set of programs to accomplish the tasks described instead of a fully integrated solution. Another alternative smaller embodiment would be to skip the single point of entering configuration data. An optional feature is an auto pilot feature that would tighten security automatically based on monitored data. Another optional feature would be to integrate additional security sources, such as physical security systems, regional security alert systems, or near-by SCADA systems.

The invention interacts with SCADA components which include the data acquisition subsystem, the alarm subsystem, the user interface subsystem, and system accesses and interfaces. This invention affects real-world interfaces by restricting the use of system interfaces and system accesses. Once a cyber security event is identified, the user can disable remote connections that are included for business reasons, but not critical to the operation of the system (for example, lower priority telemetry from RTUs or ICCP links, and interfaces to various back office functions, such as accounting). Also, remote access by support personnel or vendors can be disabled, and existing connections to the user interface can be dropped.

Figure 7:
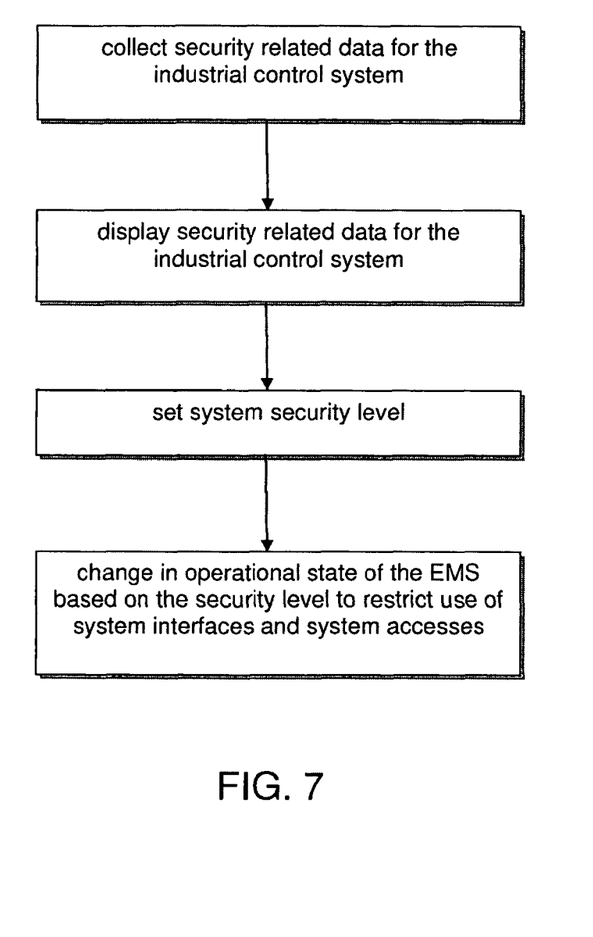
FIG. 7 shows a flow chart of an embodiment of the invention.

FIG. 7 shows a flow chart of the method for providing an integrated command and control user interface in a Supervisory Control And Data Acquisition (SCADA) to enhance situational awareness and cyber security management for industrial control systems, the method comprising: providing a centralized System Security Manager (SSM) program module executable by a processing device and integrated into a SCADA wherein the SSM collects security related data for the industrial control system; displaying by the SSM program module an integrated command and control user interface comprising a system monitoring pane comprising security related data collected by the SSM, a system security status pane comprising a system security level, and a system security settings pane allowing for changing of system security settings for the industrial control system; and wherein the integrated command and control user interface allows setting of the system security level based on the security related data collected and changes in operational state of the SCADA based on the security level to restrict use of system interfaces and system accesses.

Figure 5:
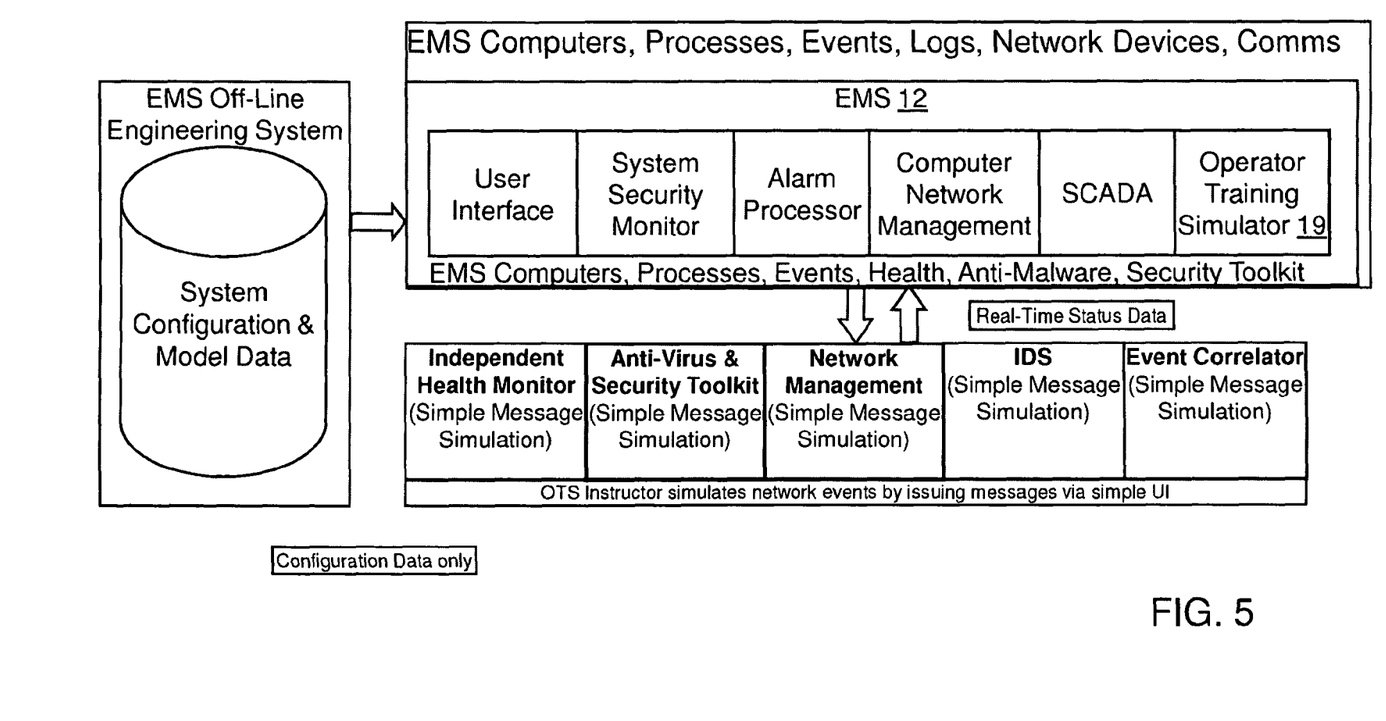
FIG. 5 is an architectural drawing illustrating the Training Mode.

FIG. 5 is an architectural drawing illustrating the Training Mode. Operator Training Simulator (OTS) Support will now be described. For the SSM and IHM, they are supported in the Operator Training Simulator environment, and allow trainer scenarios to be created that trigger different inputs into the IHM and SSM so that Operators can be trained on the proper way to respond by setting the SSM security level, and to start collecting forensic information. Since the OTS uses the same UI as the SCADA, and the SSM also uses the same UI, the inputs from external systems like the network IDS, ECE and the IHM can be modeled in the Control Center Model (CCM) of the OTS for trainer directed actions during training scenarios, ensuring that during real events, the Operator will react properly, tighten security of the system, and ensuring proper collection of forensics.

In the last two decades, power systems have become increasingly complex and the requirements placed on Operators in all phases of system operations: normal, emergency and restorative, have increased correspondingly. In past years, training of power system control center Operators was done largely on the job. Experience and skill were gradually accumulated over the years. Experience in the operation of the power system under normal conditions was accumulated relatively quickly since most systems are operated under normal conditions most of the time. However, experience in alleviating emergencies and in restoring the system from total or partial blackouts is accumulated much more slowly since on most systems, these conditions occur much less often.

With an Operator Training Simulator (OTS), it has become possible to improve the quality of training for power system Operators. The OTS allows Operators to be exposed to simulated power system emergencies and to practice alleviating these emergencies. Similarly, Operators may practice system restoration under simulated conditions. Since Operators may be exposed to simulated emergency and restorative conditions on the OTS, frequently and at will, as opposed to rarely and by chance on the job; the time required to train a new operator may be significantly shortened. Similarly, with an OTS, it becomes possible to expose existing Operators to emergencies and restoration procedures as part of refresher training. With an OTS, it is possible to achieve and to maintain a high level of operational readiness among power system Operators.

The OTS may be based on technology initially developed at Siemens as part of the Electric Power Research Institute research project RP1915-2, "Operator Training Simulator" and RP1915-8 "UNIX based PSM for OTS" and further enhanced by Siemens.

Important attributes of the OTS include fidelity and accuracy. Fidelity and accuracy mean that the OTS behaves as the real world does. The simulator presents results to the Operators that are as accurate as those observed by the SCADA system using typical power system telemetry. Fidelity means the operator uses User Interface and Application functions that are identical in the OTS and in the SCADA.

An Educational Subsystem is provided with features which allow the instructor to construct groups of one or more training events or power system disturbances and to store and retrieve these groups of events.

The simulator has the capability of starting from any one of several stored base cases. This enables the operator to study a variety of different cases by starting from any base case and making changes if necessary to create the specific case desired. This capability can be used by the operator to study various cases that simulate day-to-day operations.

Turning now to the OTS functional description, the overall simulator system can be logically divided into five principle subsystems; the Educational System, the Power System Model (PSM), the Computer System Model (CSM), the Control Center Model (CCM), and the User Interface (UI). FIG. 5 shows the relationship of these subsystems and their components with the exception of UI. The UI interface affects input and output for the Control Center.

The PSM simulates response of power system devices to control actions, which were initiated either from the Educational System or Control Center Model. The PSM includes a load model function, transmission system network modeling and a set of generator models to simulate dynamic response. The CSM holds a representation of the SCADA computers, computer networks and other Cyber assets to support simulation of attacks on the SCADA computer infrastructure.

The Control Center Model includes a replica of the control functions in the SCADA. Included are selected SCADA, Automatic Generation Control, Transmission Network Analysis functions and Security Monitoring applications.

The Educational Subsystem provides a means for sequences of events to be defined, stored and retrieved by the instructor. Separate displays are used to define each sequence and to catalog by title those presently stored.

Turning now to the OTS Capabilities, the OTS provides the trainee with the capability to perform generation and transmission dispatching functions in simulation mode. The OTS is specifically designed to permit training an operator in all phases of system operation: normal, emergency and restoration. Also included is the ability to train the operator on proper response to and management of Cyber security situations. The Control Center Model includes a replica of the Control functions in use in the SCADA. Replication means that the features and UI of these functions in the SCADA and OTS are identical, as seen by the trainee at his console. The following functions are included in the OTS: Data Acquisition, Data Processing, Data Dissemination, Supervisory Control, Automatic Generation Control, Power System Network Analysis functions, and System Security Monitor.

The SCADA functions that have interaction with RTUs are altered so that they interact with the Power System Model, but are identical from the viewpoint of the trainee. The same is true of the SCADA functions that have interaction with Cyber assets.

Turning now to the OTS Educational Subsystem, the OTS includes an Educational Subsystem which allows the instructor to set up the event groups which make up the scenarios (pre-session activities), to participate in the scenario (session activities) and to debrief the trainee (post-session activities).

The OTS provides the instructor with the ability to conduct pre-session activities. These include the preparation, editing and saving of a base case. A base case may be retrieved from a previously stored base case, may be obtained from a real-time snapshot, or may be created interactively during simulation.

Groups of events or system malfunctions may be created and implemented along with a base case to create a scenario. Events are scheduled to occur based on the time specified in the scenario. Once a group of events is defined, the group of events may be saved, edited or restored. Multiple event groups may be activated concurrently. The following are some examples of events: Scenario Control (Simulation stop, Simulation pause, Messages to the instructor to take certain actions or contact the trainee at certain times); Power System Events (Total or partial loss of a generator output, Total or partial loss of a bus loading), System load changes (spikes, steps), Unit derating, Change in scheduled interchange transaction between the AGC control areas, Change the desired voltage controlled by generators, Change minimum and maximum voltage regulation limits of LTCs, Change in unit status (automatic, manual, etc.), Circuit breaker trip, Circuit breaker close, Circuit breaker trip with successful reclosure; this can be used to simulate the occurrence of temporary faults on transmission lines, Circuit breaker trip with unsuccessful reclosure; this can be used to simulate the occurrence of permanent faults on transmission lines, bus faults, or generator faults, Breaker disable—Disables any Supervisory Control action on a specific breaker, Breaker enable—Enables any Supervisory Control action on a specific breaker, Stuck Breaker—Disables breaker specified and identifies up to six breakers that operate due to breaker failure, Relay disable, Relay enable, LTC disable—Disables voltage regulation of LTC, LTC enable—Enables a previously disabled LTC); Cyber Events (Loss of RTU, Restore RTU, Loss of a single point of an RTU, RTU telemetry failure, Restore of a single point of an RTU, Replace analog points (bad data), Replace digital points (bad data), Blocking of control signals from AGC to generating units, SNMP detected status changes of a network device, Change in status of a server, Firewall/router status/security events, IDS detected events).

A relative or absolute event is executed when the simulation time becomes equal or larger than the time of the event. A conditional event is executed whenever the result of a "logical function" becomes true.

The Event Scheduler provides a menu-driven method of selecting event types, equipment names and actions while creating event scenarios. The instructor is not required to manually type in any event data. Event equipment data may be selected from a one-line display and "dropped" into the event window. By using this feature, it is not required that the instructor know the names of every piece of equipment since the equipment can be selected from the one-line diagrams or the menu.

The OTS provides the instructor with facilities to be used in the debriefing of the trainee. The OTS may be reinitialized to a periodic or manual snapshot and the simulation may be resumed to review part of the scenario with the trainee. Key data is saved and presented to the instructor on instructor and trainee logs to assist the instructor with analyzing the scenario.

The instructor is notified of any drastic changes in the PSM, such as island blackout, relay trips, through the Instructor Message Window. It shows any switching actions that occur on the PSM or CCM. The simulation time and frequency is shown. In addition, if there are any simulation command or data entry validation errors, this is also shown in this window. Any simulation commands and the OTS responses are reported in the Instructor Message Window. In some instances, the Instructor Message Window also prompts the instructor for the correct simulation control actions.

A sample Use Case scenario will now be described. A hacker on the Internet finds an accidentally connected bridge from the Internet to the Corporate Network to the Control System Network segment that contains the SCADA. The SCADA is in a normal operating mode when the hacker begins the attack. Actors: Hacker—any type of bad person trying to perform a malicious attack, User—the current dispatcher of a SCADA, Data Engineer—the engineer who enters configuration data for the SCADA, Instructor—the teacher that uses the Operator Training Simulator to train users of the SCADA, Supervisor—the user that supervises the users/dispatchers of the SCADA. Systems: SCADA with System Security Manager, IDS—Intrusion Detection System on the network segment of the SCADA and sends key events to the ECE, ECE—Event Correlation Engine—feeds data to the SSM, SNMP Manager—Network Manager for monitoring network devices—feeds data to the IHM, IHM—Independent SCADA Health Monitor—monitors the servers of the SCADA for hardware and software issues, and feeds the data to the SSM.

Input 1: The Data Engineer has entered the data to configure the SCADA in the Engineering System. This data includes criticality indices of power system assets, all required power system information, and all required information on control system hardware. Result: The SCADA and associated functions are operating properly, and the system is being monitored for security events, and displaying related information on the SSM UI.

Input 2: The Instructor has defined security related scenarios in the OTS of the SCADA. Users have been drilled by the Instructor during training sessions in the OTS.

Input 3: The Hacker begins the attack. The Hacker accesses ports both required and not required for the operation of the SCADA. The Hacker tries to access the UI, file system, communications or databases of the SCADA.

Input 4: Any ports accessed that are not required for normal SCADA operation are alarmed by the IDS. Any traffic of required ports that is not authorized, such as trying to access the operational secure WebUI for the SCADA without an authenticated username and password is alarmed by the SCADA. Significant impacts on the health of the SCADA servers and networking devices are identified and alarmed by the Network Manager/IHM. Any events from servers, firewalls, routers, or network devices are correlated by the ECE and sent to the SSM.

Output 1: The User is notified that there are security alarms, and calls up the SSM UI. Based on the training the User has received the user performs the workflow of checking the security information, and responding. These actions of course align with the Utility's NERC Critical Infrastructure Protection (CIP) defined policy and processes for security events.

Output 2: Actions of the User tighten SCADA security, and the intruder is back-traced and then blocked out. Based on the Utility's processes, and the significance of the breach, the reporting process is initiated, and the user initiates the steps to collect needed security logs for possible analysis.

Output 3: Once the threat is over, the logs have been reviewed, and the mis-configured bridge identified and repaired, the SCADA Security level is set back to normal.

An exemplary system for implementing the invention includes a computing device or a network of computing devices. In a basic configuration, computing device may include any type of stationary computing device or a mobile computing device. Computing device typically includes at least one processing unit and system memory. Depending on the exact configuration and type of computing device, system memory may be volatile (such as RAM), non-volatile (such as ROM, flash memory, and the like) or some combination of the two. System memory typically includes operating system, one or more applications, and may include program data. Computing device may also have additional features or functionality. For example, computing device may also include additional data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules or other data. System memory, removable storage and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by computing device. Any such computer storage media may be part of device. Computing device may also have input device(s) such as a keyboard, mouse, pen, voice input device, touch input device, etc. Output device(s) such as a display, speakers, printer, etc. may also be included.

Computing device also contains communication connection(s) that allow the device to communicate with other computing devices, such as over a network or a wireless network. By way of example, and not limitation, communication connection(s) may include wired media such as a wired network or direct-wired connection, and wireless media such as acoustic, RF, infrared and other wireless media.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or an information processing apparatus which includes a memory, such as a central processing unit (CPU), a RAM and a ROM as well as a storage medium such as a hard disc.

The "step-by-step process" for performing the claimed functions herein is a specific algorithm and is shown in the text of the specification as prose and/or in the flow charts. The instructions of the software program create a special purpose machine for carrying out the particular algorithm. In any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A computer-implemented method for providing an integrated command and control user interface in a Supervisory Control And Data Acquisition (SCADA) system to enhance situational awareness and cyber security management for industrial control systems, the method comprising:
    providing a centralized System Security Manager (SSM) program module executable by a processing device and integrated into the SCADA system wherein the SSM collects security related data for the industrial control system;
    displaying by the SSM program module an integrated command and control user interface comprising a system monitoring pane comprising security related data collected by the SSM, a system security status pane comprising a system security level, a system security settings pane allowing for changing of system security settings for the industrial control system, and a configuration pane to configure the SCADA system; and
    entering configuration data via the configuration pane only once;
    wherein the integrated command and control user interface allows setting of the system security level based on the security related data collected and changes in operational state of the SCADA system based on the security level to restrict use of system interfaces and system accesses.

2. The computer-implemented method of claim 1 wherein the system security level comprises a plurality of levels where each level includes restrictions from lower levels.

3. The computer-implemented method of claim 1 wherein the system security level is associated with cyber security and physical security of the industrial control system.

4. The computer-implemented method of claim 1 wherein the configuration pane to configure the SCADA includes defining of criticality indices of power system assets of the industrial control system.

5. The computer-implemented method of claim 4 wherein the criticality indices comprise a measurement of critical infrastructure importance associated with power system assets of the industrial control system.

6. The computer-implemented method of claim 5 wherein the SSM calculates and displays in the integrated command and control user interface an overall Criticality Index for each Remote Terminal Units (RTU) link and Inter Control-Center Communications Protocol (ICCP) link based on the criticality indices of power system assets to provide Situational Awareness of the critical infrastructure importance associated with a link.

7. The computer-implemented method of claim 1 further comprising disabling less secure connections and accesses to the system based on the system security level.

8. The computer-implemented method of claim 6 further comprising automatically isolating communications in a prioritized fashion based on the overall Criticality Index in response to an elevation of the security level.

9. The computer-implemented method of claim 1 further comprising automatically implementing predictive state changes in operational state of the SCADA due to predetermined patterns in the security related data.

10. The computer-implemented method of claim 1 wherein the security related data comprises one or more of Intrusion Detection System (IDS) monitoring with SCADA signatures, SCADA security alarms, SCADA user connections, SCADA Remote Terminal Unit (RTU) and Inter Control-Center Communications Protocol (ICCP) link status, SCADA security related telemetry, health monitoring events collected via Web Based Enterprise Management (WBEM) for SCADA computer monitoring, Simple Network Management Protocol (SNMP) for network devices via third party products, system events correlated by a third party event correlation product, and system statistics.

11. The computer-implemented method of claim 1 further comprising providing an interface for the SSM to an Independent SCADA Health Monitor to monitor the health of SCADA computers and networking devices.

12. The computer-implemented method of claim 1 wherein the SSM is further interfaced with an Event Correlation Engine (ECE) to send the SSM key events from the ECE to provide a wider system view.

13. The computer-implemented method of claim 1 further comprising providing a white list functionality that allows IP addresses or ranges to be defined which are trusted and not deemed as high a security risk so that white list traffic will not set an alarm.

14. The computer-implemented method of claim 1 further comprising providing a black list functionality that allows IP addresses or ranges to be defined which are deemed a security risk so that black listed traffic will always set an alarm.

15. The computer-implemented method of claim 1 further comprising trace-back of identified security event sources when a security event is identified.

16. The computer-implemented method of claim 1 further comprising a selectable autopilot function to allow the SSM to automatically set the security level based on security related data collected.

17. The computer-implemented method of claim 1 further comprising a simulation mode for training purposes.

18. A system for providing an integrated command and control user interface in a Supervisory Control And Data Acquisition (SCADA) system to enhance situational awareness and cyber security management for industrial control systems, comprising:
   a processing device;
   a centralized System Security Manager (SSM) program module executable by the processing device and integrated into the SCADA system wherein the SSM collects security related data for the industrial control system; and
   an integrated command and control user interface for displaying security related data collected by the SSM, a system security level, system security settings, wherein the user interface provides for changing of system security settings for the industrial control system and setting of the system security level based on the security related data collected, changing operational state of the SCADA system based on the security level to restrict use of system interfaces and system accesses, and configuring the SCADA system with configuration data entered only once.

19. The system of claim 18 further comprising an integrated Operator Training Simulator for training operators on the use of the command and control user interface combined with security traffic and event scenarios.

20. A computer program product having a non-transitory computer readable storage medium operable to store computer program logic embodied in computer program code encoded as a set of processor based instructions thereon for, when executed by a processor in a computer, performing the steps of claim 1.

* * * * *